United States Patent
Krishnan et al.

(10) Patent No.: US 10,066,136 B2
(45) Date of Patent: Sep. 4, 2018

(54) POLYURETHANE-ACRYLATE EPOXY ADHESIVE

(71) Applicant: Dow Global Technologies LLC, Midland, MI (US)

(72) Inventors: Bindu Krishnan, Lake Jackson, TX (US); Laura A. Grier, Brazoria, TX (US); William H. Heath, Lake Jackson, TX (US); Adam C. Colson, Lake Jackson, TX (US); Mikhail Y. Gelfer, Sugarland, TX (US); Gary L. Jialanella, Oxford, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/121,663

(22) PCT Filed: Mar. 31, 2015

(86) PCT No.: PCT/US2015/023494
§ 371 (c)(1),
(2) Date: Aug. 25, 2016

(87) PCT Pub. No.: WO2015/164031
PCT Pub. Date: Oct. 29, 2015

(65) Prior Publication Data
US 2017/0029673 A1    Feb. 2, 2017

Related U.S. Application Data

(60) Provisional application No. 61/982,446, filed on Apr. 22, 2014.

(51) Int. Cl.
*C08L 63/00*    (2006.01)
*C09J 163/00*    (2006.01)
(Continued)

(52) U.S. Cl.
CPC ............ *C09J 163/00* (2013.01); *C08G 18/10* (2013.01); *C08G 18/12* (2013.01); *C08G 18/242* (2013.01);
(Continued)

(58) Field of Classification Search
CPC .. C08G 18/10; C08G 18/4841; C08G 18/672; C08G 18/7621; C08G 18/12;
(Continued)

(56) References Cited

U.S. PATENT DOCUMENTS 3,078,563 A    2/1963    Gould et al.
5,112,932 A    5/1992    Koenig et al.
(Continued)

FOREIGN PATENT DOCUMENTS

EP    0338985 A2    10/1989
GB    2210623 B    4/1991
(Continued)

*Primary Examiner* — David T Karst (57) ABSTRACT

The invention relates to isocyanate-free elastomer adhesives based on hybrid urethane-acrylate epoxies. The hybrid shows properties consistent for structural adhesives with excellent mechanical and thermal stability, and low read-through. The adhesives are suitable for use in industry, e.g., as adhesives for automotive applications.

11 Claims, 3 Drawing Sheets

(51) Int. Cl.
*C08G 18/48* (2006.01)
*C08G 18/67* (2006.01)
*C08G 18/76* (2006.01)
*C08G 18/10* (2006.01)
*C08G 18/12* (2006.01)
*C09J 175/16* (2006.01)
*C08G 59/40* (2006.01)
*C08G 59/44* (2006.01)
*C08G 18/24* (2006.01)
*C08G 59/56* (2006.01)
*C08K 3/20* (2006.01)
*C08K 9/06* (2006.01)
*C09J 5/04* (2006.01)
*C08K 3/22* (2006.01)

(52) U.S. Cl.
CPC ....... *C08G 18/4841* (2013.01); *C08G 18/672* (2013.01); *C08G 18/7621* (2013.01); *C08G 59/4064* (2013.01); *C08G 59/44* (2013.01); *C08G 59/56* (2013.01); *C08K 3/20* (2013.01); *C08K 9/06* (2013.01); *C08L 63/00* (2013.01); *C09J 5/04* (2013.01); *C09J 175/16* (2013.01); *C08K 2003/2206* (2013.01); *C08K 2201/019* (2013.01)

(58) Field of Classification Search
CPC .. C08G 59/4064; C08G 59/44; C08G 18/242; C08G 59/56; C09J 163/00; C09J 175/16; C09J 5/04; C08L 63/00; C08K 3/20; C08K 9/06; C08K 2003/2206; C08K 2201/019
USPC .......................................... 156/330; 525/532
See application file for complete search history.

(56) References Cited

U.S. PATENT DOCUMENTS

| | | | | |
|---|---|---|---|---|
| 5,232,996 | A * | 8/1993 | Shah | C09J 163/00 525/452 |
| 5,426,157 | A * | 6/1995 | Starner | C08G 18/672 525/452 |
| 8,220,695 | B1 | 7/2012 | Wei et al. | |
| 8,816,021 | B2 | 8/2014 | Mizori et al. | |
| 8,921,490 | B2 | 12/2014 | Levandoski et al. | |
| 2007/0155879 | A1 | 7/2007 | Osae et al. | |
| 2012/0184640 | A1* | 7/2012 | Kim | G02B 1/105 522/150 |
| 2012/0225969 | A1* | 9/2012 | Miyabayashi | C08F 290/067 522/53 |

FOREIGN PATENT DOCUMENTS

| | | |
|---|---|---|
| JP | 5013196 B | 8/2012 |
| WO | 1992020753 A1 | 11/1992 |
| WO | 2008140906 A1 | 11/2008 |
| WO | 2010118421 A1 | 10/2010 |
| WO | WO-2012082224 A1 * | 6/2012 ........... C08G 59/245 |

* cited by examiner

POLYURETHANE-ACRYLATE EPOXY ADHESIVE

FIELD OF THE INVENTION

The present invention relates to hybrid adhesive compositions comprising epoxy and acrylate functionalities, cured in the presence of thiol and amine, which is preferably free of isocyanates.

INTRODUCTION

Regulatory pressure is driving the adhesives and sealants market towards eco-friendly systems with requirements varying from low- to near-zero VOC (volatile organic compounds), as well as adhesives that are phthalate free, and that are either free, or have reduced levels, of monomeric isocyanate. Among the various application areas, the transportation sector has been experiencing the fastest growth among any major adhesive end market.

Traditionally epoxy, polyurethane and methyl methacrylate (MMA) and MMA/epoxy hybrids have been used for structural bonding in automotive applications. Various environmental legislations including the Federal CAFÉ Standards are driving the automotive industry to develop lighter cars to reduce carbon emission targets and improve fuel efficiency. Hence, designing and manufacturing a commercially viable lightweight vehicle, whilst maintaining structural performance, remains a top priority for the automotive industry. Manufactures are moving away from all-steel vehicles and using reliable lighter weight materials like aluminum, magnesium, and sheet molding compound (SMC). Advanced lightweight materials like carbon fiber composites, glass fiber-reinforced polyamide (GFPA), glass fiber-reinforced polypropylene (GFPP), polycarbonate, acrylonitrile butadiene styrene (PC-ABS) and polyurethane reaction injection molding (PUR-RIM) are also being used more often to accommodate evolving vehicle designs. This light weight trend results in the need for novel environmentally friendly bonding technologies that can bond these non-traditional substrates while maintaining the structural strength requirements.

The choice of adhesive is determined by the application as well as the manufacturing process. Typically, application processes during manufacturing involve the use of high temperatures which could be detrimental for the adhesive. The typical adhesive families used in automobile manufacturing are classified into structural adhesive and elastic adhesive. Structural adhesives are high modulus adhesives while elastic adhesives are low modulus systems. Due to the requirement of high strength and modulus, structural adhesive generally belong to the epoxy as well as polyurethane family. But high temperature manufacturing processes limit the use of polyurethane due to its poor thermal stability. However in processes that involve assembly at lower temperature (e.g., <150° C.) and room temperature, polyurethane has generally been the adhesive of choice.

Polyurethanes adhesives can be obtained from polyisocyanate reacted with two different types of isocyanate-reactive materials. The first of these is a longer chain, flexible material such as certain hydroxyl-terminated polyethers, polycarbonates, polyesters and or polybutadienes elastic adhesives. The second type of isocyanate-reactive material is a chain extender or crosslinker. The chain extender or crosslinker is a short-chain polyol or polyamine, or even water in some cases. A portion of the isocyanate groups reacts with the longer chain, flexible material, and another portion reacts with the chain extender or crosslinker. When the polyisocyanate reacts with the chain extender, a polymeric segment forms which contains two or more closely-spaced urethane or urea groups. The urethane and urea groups are capable of forming hydrogen bonds with each other, and in doing so can produce small domains of highly hydrogen-bonded material dispersed in the longer chain, flexible material (which also becomes bonded into the polymer chain). It is the formation of these highly hydrogen-bonded domains and their ability to phase segregate from the longer chain, flexible material that gives polyurethanes their combination of elongation and tensile strength. The highly hydrogen-bonded domains are commonly known as the "hard segment" of the elastomer, whereas the phase made up of mostly the longer chain flexible material is commonly known as the "soft segment".

High modulus polyurethane adhesives require high hard segment content, contributed from isocyanate. A problem with polyurethanes is that, although the isocyanate chemistry is central to its benefits, there are potential worker exposure concerns if polyisocyanate compounds are not handled properly. This has been considered a major drawback due to regulatory constraints and environmental considerations.

One way to limit human exposure to isocyanate compounds, would be to provide an alternate, curable polymer system that does not contain free isocyanate compounds. However, it is believed that there are currently no other polymer systems available that offer the advantages of rapid curing from liquid, low viscosity precursors at ambient or at most moderately elevated temperatures, of being suited for small-scale, in-field applications (while also being entirely suitable for large industrial-scale part production) and of forming an elastomeric material that has a good combination of elongation and tensile strength.

US Patent publication 2007/0155879 A1 (the disclosure of which is incorporated herein by reference in its entirety) discloses a two-part structural adhesive composition particularly for use with metals comprising one or more vinyl monomers, preferably an acrylate or methacrylate ester monomer, one or more soluble or dispersible polymers, and acetylenic diol adhesion promoter, and preferably one or more polymerizable acid adhesion promoters.

WO 1992/020753 A1 (AU patent 199223163A) (the disclosure of which is incorporated herein by reference in its entirety), is entitled "One-Part Primerless Structural Adhesive." The adhesive comprises: (a) a free-radically reactive, ethylenically unsaturated polymer, (b) a (meth)acrylic diluent free-radically reactive with (a), (c) a stabilizing amount of a free-radical polymerization inhibitor, (d) an effective amount of a free-radical polymerization initiator and (e) a filler. The preferred thickness of adhesive is greater than 3 mm. The heat-curable ingredients are (a) and (b). The polymer is preferably a vinyl urethane, (meth)acrylated urethane, (meth)acrylated epoxy, vinyl-terminated butadiene nitrite resin, an unsaturated polyester, and/or a vinyl-modified (meth)acrylic resin. The vinyl urethane is prepared by reacting a polyol of mol. wt. 62 to 8,000 with excess polyisocyanate to form a prepolymer, then further reacting the prepolymer with a hydroxyl-containing free-radically polymerizable ethylenically unsaturated compound. It is disclosed that the adhesive is formulated in a single package, it does not require a primed composite surface, its strength is such that a joint fails by delamination of the composite rather than adhesive failure, it cures readily in air, and it is stable at room temperature for up to 3 months. It is disclosed to be used in the manufacture of cars, trucks, boats, etc.

The adhesives in these two documents are acrylic/methacrylic adhesives, which cure via exothermic reactions. The exothermic reactions can lead to "read-through," which is a condition in which the structural adhesive causes the substrate to deform. Adhesive bond-line read-through is a visible distortion of the substrate over a cured adhesive bond-line. Bond-line read-through deformations are primarily the result of a difference in the thermal expansion coefficients between the substrate and the adhesive. This is especially a problem when bonding e-coated substrates, as read-through can cause deformation or peeling of the e-coat. Read-through is a major constraint associated with acrylate and methacrylate adhesives.

There remains a need for adhesives, e.g., for assembling automobiles, for bonding diverse, dissimilar substrates, which can help manage the differences in thermal expansion properties.

There remains a need for an epoxy polyurethane hybrid adhesive that can withstand high curing temperatures.

There remains a need for adhesives that are more environmentally friendly, such as adhesives that are either free, or have reduced levels, of monomeric isocyanate.

There remains a need for structural adhesives with improved (i.e., reduced) read-through.

SUMMARY OF THE INVENTION

An isocyanate-free elastomer that shows characteristics similar to, or better than, conventional polyurethanes, has been developed. This invention is in one aspect a process for forming an polymer that comprises a) forming a reaction mixture containing 1) at least one polyene compound having an average of at least two groups containing aliphatic carbon-carbon double bonds capable of reaction with a thiol group, wherein at least one of such aliphatic carbon-carbon double bonds is separated from another said aliphatic carbon-carbon double bond by an aliphatic spacer group having a weight of at least 1000 atomic mass units, 2) from 20 to 150 parts by weight, per 100 parts by weight of component 1), of at least one epoxy resin having an average of at least 1.5 epoxide groups per molecule and an epoxy equivalent weight of up to 1000, 3) at least one curing agent having a combination of thiol and amine groups, and 4) at least one basic catalyst, and b) curing the reaction mixture to form the polymeric elastomer. The system, shown in the scheme below, is a hybrid urethane-acrylate epoxy system cured with multifunctional thiols and amines in the presence of a base catalyst.

Conventional thiol-ene materials are mostly hard, glassy polymers having very low elongation. Unlike conventional thiol-ene polymers, the adhesives of the present invention are strengthened by incorporating epoxy hard segments into the matrix. These phase-separated hybrid systems offer unexpectedly advantageous mechanical properties and/or cure profile and/or reduced read-through, and preferably an unexpectedly advantageous balance of mechanical properties and cure profile.

The present invention provides an adhesive comprising resin portion A and crosslinker portion B: the resin portion A comprising A1) an acrylate-tipped polyurethane, and A2) an epoxy resin; the crosslinker portion B comprising B1) a polythiol, B2) a polyamine, and B3) a catalyst. The present invention also provides a method of bonding two surfaces comprising: a) combining resin portion A and crosslinker portion B according to the present invention to form an uncured adhesive; b) applying the uncured adhesive such that it is in contact with a first surface and a second surface; and c) curing the uncured adhesive.

DETAILED DESCRIPTION OF THE INVENTION

Preferred adhesives according to the present invention are 2-component (2K) adhesives. The components of the adhesive include resin portion A and crosslinker portion B.

Resin portion A preferably comprises at least an acrylate-tipped polyurethane and an epoxy resin. This hybrid system comprises an acrylate tipped polyurethane and an epoxy resin, that are cross-linked with thiol and amine, as exemplified in Scheme 1, below:

The acrylate-tipped polyurethane may be made by any method by one of ordinary skill in the art. In a preferred method, it can be made by reacting a polymeric polyol, e.g., multi-functional polyether polyol and isocyanate to completion to obtain a pre-polymer. Preparation of the pre-polymer is preferably aided with a catalyst, e.g., a metal catalyst, preferably a tin catalyst, such as dibutyl tin dilaurate. Percent NCO determines the completion of the reaction. Isocyanate levels range from 2 to 5%. A preferred % NCO is 2 to 2.5%. The pre-polymer may then be end-capped with acrylate using, e.g., an acrylate-containing reagent such as an alkyl acrylate, e.g., hydroxyethyl acrylate, preferably in the presence of a catalyst. The higher the % NCO, the higher the viscosity of the encapped material. A typical structure of the acrylated tipped polyurethane is indicated below.

DER 383

Thiocure DMPT

Urethane Acrylate

IPDA

Base catalyst

The epoxy and acrylate are linked to each other with the thiol as well as the amine. The blend of acrylate tipped polyurethane and epoxy comprise one of the components for the 2K system, commonly referred to as "Component A." The level of epoxy plays a role in reducing the viscosity of component A, and can also affect the mechanical properties of the final hybrid.

Any polyol suitable for formation of a polyurethane block may be used. Typical polyols are aliphatic. These include groups that contain sequences of linear or branched aliphatic carbon-carbon single bonds and/or non-conjugated double bonds, aliphatic ether bonds, aliphatic amine bonds, and/or other like bonds within their main chain. Some preferred polyols are aliphatic polyether chain that preferably has a weight of at least 1500, more preferably at least 2000, still more preferably at least 3000, and in some embodiments at least 4000, to as much as 20,000, preferably up 12,000 and more preferably up to 8,000 g/mol. The polyether chain may be, for example, a polymer of ethylene oxide, 1,2-propylene oxide, 1,2-butylene oxide, 2,3-butylene oxide, tetramethylene oxide, and the like. An especially preferred polyol is based on poly(1,2-propylene oxide) chain and end-capped with ethylene oxide polymer. The polyols can have a weight of at least 1000 atomic mass units, preferably at least 1500 atomic mass units, more preferably at least 2000 atomic mass units, still more preferably at least 3000 atomic mass units and in some embodiments at least 6000 atomic mass units. The resulting polyol on reaction results in a polymer having a glass transition temperature of no greater than −20° C., preferably no greater than −35° C. and more preferably no greater than −40° C. The polyol functionality is preferably 2 to 5, more preferably 2 to 3. Polyol functionality can be increased, for example, by use of a polyol, preferably glycerol, in the reaction mixture.

Any di- or multi-functional isocyanate may be used, including di-isocyanates, tri-isocyanates, etc. Because excessive branching could lead to a highly viscous or gel product, di-isocyanates are preferred. The polyfunctional isocyanate is preferably the limiting reactant. The polyisocyanate may be, for example, an aromatic polyisocyanate such as diphenylmethane diisocyanate or toluene diisocyanate or an aliphatic polyisocyanate such as isophorone diisocyanate, hexamethylene diisocyanate, hydrogenated toluene diisocyanate, hydrogenated diphenylmethane diisocyanate, and the like. This produces a prepolymer that contains urethane groups and terminal isocyanate groups.

The resulting isocyanate groups of the urethane block (pre-polymer) are then capped with an isocyanate-reactive capping compound having a hydroxyl group and an ene group as described before. The ene groups are provided in the form of terminal α,β-unsaturated carboxylate groups, such as, for example, acrylate (—O—(O)—CH=CH$_2$) groups or methacrylate (—O—C(O)—C(CH$_3$)=CH$_2$) groups. Examples of such isocyanate-reactive capping compounds include, for example, allyl alcohol, vinyl alcohol and hydroxyalkylacrylate and/or hydroxyalkylmethacrylate compounds such as hydroxyethylacrylate and hydroxyethylmethacrylate.

A preferred reagent is hydroxyethyl acrylate, preferably in the presence of a catalyst. The reaction is preferably done with heating. The reaction is preferably run until the isocyanate has completely reacted, such that there is no, or essentially no, remaining free (monomeric) isocyanate. Preferably, reaction progress is monitored by FTIR. The reaction can be considered complete, with no remaining free monomeric isocyanate, upon the disappearance of the —NCO stretch at ~2250 cm$^{-1}$.

The molecular weight (Mw) of the urethane acrylate is not particularly limited, and can be determined by one of ordinary skill in the art for a particular application, using the present disclosure as a guide. The Mw should be high enough that the urethane block soft segments impart suitable elasticity to the adhesive. The Mw should be low enough that the acrylate polymer is not so viscous that it is either difficult to process, or too viscous to combine with the epoxy resin, e.g., to obtain a mixture of suitable proportions and/or viscosity.

The hard segment of the adhesive of the present invention is preferably derived from the epoxy blocks. The epoxy resin preferably comprises one or more materials having an average of at least 1.5, preferably at least 1.8 epoxide groups per molecule, and an epoxy equivalent weight of up to 1000. The epoxy equivalent weight is preferably up to 500, more preferably is up to 250 and still more preferably up to 225. The epoxy resin preferably has up to eight epoxide groups and more preferably has 1.8 to 4, especially 1.8 to 3, epoxide groups per molecule.

The epoxy resin is preferably a liquid at room temperature, to facilitate easy mixing with other components. However, it is possible to use a solid (at 25° C.) epoxy resin, particularly if the epoxy resin is soluble in the polyene compound, and/or if the epoxy resin is provided in the form of a solution in a suitable solvent.

Among the useful epoxy resins include, for example, polyglycidyl ethers of polyphenolic compounds, by which it is meant compounds having two or more aromatic hydroxyl (phenolic) groups. One type of polyphenolic compound is a diphenol (i.e., has exactly two aromatic hydroxyl groups) such as, for example, resorcinol, catechol, hydroquinone, biphenol, bisphenol A, bisphenol AP (1,1-bis(4-hydroxylphenyl)-1-phenyl ethane), bisphenol F, bisphenol K, tetramethylbiphenol, or mixtures of two or more thereof. The polyglycidyl ether of such a diphenol may be advanced, provided that the epoxy equivalent weight is about 1000 or less, preferably about 250 or less and more preferably about 225 of less.

Suitable polyglycidyl ethers of polyphenols include those represented by structure (I)

wherein each Y is independently a halogen atom; each m may be 0, 1, 2, 3 or 4; each D is a divalent hydrocarbon group suitably having from 1 to about 10, preferably from 1 to about 5, more preferably from 1 to about 3 carbon atoms, —S—, —S—S—, —SO—, —SO$_2$, —CO$_3$— —CO— or —O—; and p is a number such that the compound has an epoxy equivalent weight of up to 1000, preferably 170 to 500 and more preferably 170 to 225. Typically, p is from 0 to 1, especially from 0 to 0.5.

Fatty acid-modified polyglycidyl ethers of polyphenols, such as D.E.R. 3680 from The Dow Chemical Company, are useful epoxy resins.

Other useful polyglycidyl ethers of polyphenols include epoxy novolac resins. The epoxy novolac resin can be generally described as a methylene-bridged polyphenol compound, in which some or all of the phenol groups are capped with epichlorohydrin to produce the corresponding glycidyl ether. The phenol rings may be unsubstituted, or may contain one or more substituent groups, which, if present are preferably alkyl having up to six carbon atoms and more preferably methyl. The epoxy novolac resin may have an epoxy equivalent weight of about 156 to 300, preferably about 170 to 225 and especially from 170 to 190. The epoxy novolac resin may contain, for example, from 2 to 10, preferably 3 to 6, more preferably 3 to 5 epoxide groups per molecule. Among the suitable epoxy novolac resins are those having the general structure:

in which l is 0 to 8, preferably 1 to 4, more preferably 1 to 3, each R is independently alkyl or inertly substituted alkyl, and each x is independently 0 to 4, preferably 0 to 2 and more preferably 0 to 1. R' is preferably methyl if present.

Other useful polyglycidyl ethers of polyphenol compounds include, for example, tris(glycidyloxyphenyl)methane, tetrakis(glycidyloxyphenyl)ethane, and the like.

Still other useful epoxy resins include polyglycidyl ethers of polyols, in which the epoxy equivalent weight is up to 1000, preferably up to 500, more preferably up to 250, and especially up to 200. These may contain 2 to 6 epoxy groups per molecule. The polyols may be, for example, alkylene glycols and polyalkylene glycols such as ethylene glycol, diethylene glycol, tripropylene glycol, 1,2-propane diol, dipropylene glycol, tripropylene glycol and the like as well as higher functionality polyols such as glycerin, trimethylolpropane, trimethylolethane, pentaerythritol, sorbitol and the like. These preferably are used together with an aromatic epoxy resin such as a diglycidyl ether of a biphenol or an epoxy novolac resin.

Still other useful epoxy resins include tetraglycidyl diaminodiphenylmethane; oxazolidone-containing compounds as described in U.S. Pat. No. 5,112,932; cycloaliphatic epoxides; and advanced epoxy-isocyanate copolymers such as those sold commercially as D.E.R.™ 592 and D.E.R.™ 6508 (The Dow Chemical Company) as well as those epoxy resins described, for example, in WO 2008/140906.

Most desirably, epoxy compounds contain, on the average, at least one pendant or terminal 1,2-epoxy group (i.e., vicinal epoxy group) per molecule.

One preferable epoxy resin has general formula:

where n is generally in the range of 0 to about 25. Some basic liquid resins, e.g. D.E.R. 331, can have epoxy equivalent weights in the range of about 182 to 192 g/mol, and a viscosity (ASTM-D-445) of 11 to 14 Pa·sec. Others, such as D.E.R. 332, can have epoxy equivalent weights in the range of about 171 to 175 g/mol, and a viscosity (ASTM-D-445) of 4 to 6 Pa·sec. A preferred liquid epoxy resin, D.E.R. 383, has an epoxy equivalent weight in the range 176 to 183, and a viscosity (ASTM-D-445) of 9 to 10.5 Pa·sec at 25° C. Combinations of one or more liquid epoxy resin, optionally with one or more solid epoxy resin are included in the present invention. Combinations of one or more epoxy resin may be used to adjust properties of the epoxy adhesive and/or of resin portion A.

Epoxy resins that are liquid at room temperature (liquid epoxy resins) are preferred because they help to lower the viscosity of the highly viscous acrylate-tipped polyurethane. When epoxy resins that are solid at room temperature (solid epoxy resins) are used, the amount should not be so great as to lead to excessive viscosity of resin portion A mixture.

Any viscosity for a mixture of resin portion A may be used, though high viscosity could lead to processing and/or handling problems. The viscosity at room temperature (e.g., 25° C.) for a mixture of resin component A is preferably less than or about 35 Pa·sec, preferably less than or about 32 Pa·sec, 30 Pa·sec, or 27 Pa·sec. While there is no preferred lower viscosity for a mixture of resin portion A, the viscosity will generally be greater than or about 15 Pa·sec, 20 Pa·sec, or 25 Pa·sec. Some preferred viscosities include 20, 27, and 32 Pa·sec.

Any ratio of acrylate resin to epoxy resin may be used. The ratio will affect mechanical properties of the cured resin, as well as the viscosity of resin portion A. For example, a liquid epoxy resin with room temperature viscosity of about 10 Pa·s, can dilute the more viscous acrylate resin no lower than about 20 Pa·s. The ratio of epoxy resin to acrylate has been found to provide polymers with a varying mechanical properties like combination of high elongation (at least 50% and in many cases at least 100%) and good tensile strength (at least 2100 kPa (about 300 psi), preferably at least 3500 kPa (about 500 psi)). Within this broad range, elongation generally decreases with an increasing amount of epoxy resin while tensile strength and modulus tend to increase. Since structural adhesive require high strength material typical formulation had higher content of epoxy material. However, the final level of epoxy in the blends is guided by the desired mechanical properties of the cured system.

A ratio of acrylate resin to epoxy resin that provides suitable mechanical properties is preferred. In a preferred embodiment, the weight ratio of acrylate resin to epoxy resin is less than or about 60:40, preferably less than or about 50:50. In a preferred embodiment, the weight ratio of acrylate resin to epoxy resin is greater than or about 20:80, preferably greater than or about 30:70. Some preferred weight ratios include 50:50, 40:60, and 30:70.

Crosslinker portion B preferably comprises a polythiol cross-linking agent, an amine cross-linking agent, and a catalyst. Crosslinker portion B preferably also comprises an accelerator. Crosslinker portion B may also comprise other ingredients, such as fillers, thixotropic agents, wetting agents, colorant, adhesion promoters, etc.

The polythiol preferably reacts with both the ene groups of the acrylate compound (component 1) and the epoxy groups of the epoxy resin(s) to form a high molecular weight polymer.

The polythiol curing agent preferably contains at least two thiol groups. The polythiol preferably has an equivalent weight per thiol group of up to 500, more preferably up to 200 and still more preferably up to 150. This polythiol compound may contain up to 8, preferably up to 4 thiol groups per molecule.

Among the suitable polythiol compounds are mercaptoacetate and mercaptopropionate esters of low molecular weight polyols having 2 to 8, preferably 2 to 4 hydroxyl groups and an equivalent weight of up to about 75, in which all of the hydroxyl groups are esterified with the mercaptoacetate and/or mercaptopropionate. Examples of such low molecular weight polyols include, for example, ethylene glycol, diethylene glycol, triethylene glycol, 1,2-propane diol, 1,3-propane diol, dipropylene glycol, tripropylene glycol, 1,4-butane diol, 1,6-hexane diol, glycerin, trimethylolpropane, trimethylolethane, erythritol, pentaerythritol, sorbitol, sucrose and the like.

Other suitable polythiol compounds include alkylene dithiols such as 1,2-ethane dithiol, 1,2-propane dithiol, 1,3-propanedithiol, 1,4-butane dithiol, 1,6-hexane dithiol and the like, trithiols such as 1,2,3-trimercaptopropane, 1,2,3-tri (mercaptomethyl)propane, 1,2,3-tri(mercaptoethyl)ethane, (2,3-di((2-mercaptoethyl)thio)1-propanethiol, and the like. Yet another useful polythiol compound is a mercapto-substituted fatty acid having at least 2 mercapto substituents on the fatty acid chains, such as, for example, that having the structure:

Any thiol cross-linking agent may be used in the present invention. Alkyl thiols are preferred because they lend better stability to the composition, though other thiols, such as ester thiols, are also acceptable. Some commercially available polythiols include the alkyl polythiol 2,3-di((2-mercaptoethyl)thio)-1-propanethiol (commercially available as THIOCURE® DMPT from Bruno Bock) and the ester polythiol dimercaptoacetate glycol (commercially available as THIOCURE® GDMA from Bruno Bock). 2,3-di((2-mercaptoethyl)thio)-1-propanethiol is a preferred alkyl polythiol.

The amount of polythiols used can vary widely, depending on the properties that are sought in the cured product, and in some cases depending on the types of curing reactions that are desired. The maximum amount of curing agent typically provides up to 1.25 equivalents, preferably up to 1.15 equivalents and in some cases up to 1.05 equivalents of thiol groups per equivalent of acrylate and epoxy groups. Larger excesses of the curing agent tend to degrade polymer properties. Because the epoxy resin(s) can polymerize with themselves and in many cases the ene compound also is capable of self-polymerization, it is possible to provide a large excess of epoxy and/or ene groups in the reaction mixture. Thus, for example, as few as 0.1, as few as 0.25 or as few as 0.5 equivalents of thiol groups in the curing agent can be provided per equivalent of epoxy and acrylate groups.

The reaction mixture further preferably comprises, in addition to the thiol curing agent, at least one amine compound having at least two amine hydrogens. This amine curing agent preferably has an equivalent weight per amine hydrogen of up to 150. A preferred equivalent weight per amine hydrogen is up to 100. Such a curing agent contains at least one primary amino group, and/or at least two secondary amino groups. The amine compound may be, for example, an aliphatic amine, an aromatic amine or an aminoalcohol.

In the case of an aliphatic amine, the amine hydrogens each may be attached to (a) a nitrogen atom bonded directly to an acyclic aliphatic carbon atom, (b) a nitrogen atom bonded directly to a carbon atom that forms part of a cycloaliphatic ring (which ring may be heterocyclic) and/or (c) a nitrogen atom that itself forms part of an aliphatic cyclic structure. Among the suitable curing agents include, for example, aminocyclohexanealkylamines, i.e., cyclohexanes that have an amino substituent and an aminoalkyl substituent on the cyclohexane ring. Examples of such aminocyclohexanealkylamines include cyclohexanemethanamine, 1,8-diamino-p-menthane and 5-amino-1,3,3-trimethylcyclo-hexanemethylamine (isophorone diamine). Other useful amine curing agents include linear or branched polyalkylene polyamines such as, for example, diethylene triamine, triethylene diamine, tetraethylenepentamine, higher polyethylene polyamines, N',N'-bis(2-aminoethyl)ethane-1,2-diamine, 2-methylpentane-1,5-diamine and the like. Still other amine curing agents include gem-di-(cyclohexanylamino)-substituted alkanes, diaminocyclohexane, aminoethylpiperazine and bis((2-piperazine-1-yl)ethyl)amine.

Suitable aromatic amines include, for example, aniline, toluene diamine, diphenyl-methanediamine, diethyltoluenediamine and the like.

Suitable aminoalcohols include, for example, ethanolamine, diethanolamine, 1-amino-2-propanol, diisopropanolamine, and the like.

It is observed that the identity of the amine (or combination of amines) and/or thiol (or combination of thiols) can impact the properties of the cured adhesive by impacting the degree of cross-linking. This observation can be used to influence properties of the cured adhesive. The reaction mixture may contain the polythiol curing agent and the amine curing agent in a mole ratio of 1:99 to 99:1. Increasing the proportion of amine curing agent tends to lead to an increase in tensile strength and modulus, with a corresponding decrease in elongation, until the proportion of the amine curing agent reaches 50 to 60% by weight, after which further increases in the proportion of the amine curing agent tend to have little more effect on those properties.

For example, different amines can impact the elongation of the cured adhesive, and elongation of the cured adhesive can be controlled by selection of suitable mixtures of two or more amines. Without being bound by theory, it is believed that higher functionality amines and/or thiols result in greater cross-linking, which reduces elongation. Thus, replacing a portion of a higher functionality amine and/or thiol with a lower functionality amine and/or thiol is thought to decrease the degree of cross-linking, resulting in a cured adhesive having greater elongation. Therefore, mixtures of amines and/or mixtures of thiols can be used to adjust the overall amine or thiol functionality, thereby influencing the degree of branching in the cured adhesive.

For example, when two or more thiol cross-linking agents are used, they are preferably of at least two different levels of functionality. For example, if a trifunctional thiol cross-linker results in an excessively branched product (e.g., having less elongation than desired), then it can be replaced, partially or entirely, by a lower functional (e.g., difunctional) thiol crosslinker to reduce the degree of branching. A preferred combination of thiol crosslinkers comprises 2,3-di((2-mercaptoethyl)thio)-1-propanethiol and dimercaptoacetate glycol. For the purposes of the present invention, reactive monofunctional thiols are considered to be thiol cross-linkers.

When a combination of two thiol crosslinkers is used, any ratio that provides the desired properties may be used. Some suitable weight ratios of two thiols include 1:99, 10:90, 20:80, 30:70, 40:60, and 50:50.

When two or more amine crosslinkers are used, they are preferably of at least two different levels of functionality. For example, if use of a difunctional amine crosslinker results in an excessively branched product (e.g., having less elongation than desired), then it can be replaced, wholly or partially, by a monofunctional amine to reduce the degree of branching. Preferred combinations of amine include combinations of IPDA and 2-AP, and of IPDA and diethylenetriamine. For the purposes of the present invention, reactive monofunctional amines are considered to be amine cross-linkers.

When a combination of two amines is used, any ratio that provides the desired properties may be used. Some suitable weight ratios of two amines include 1:99, 10:90, 20:80, 30:70, 40:60, and 50:50.

Combinations of thiol and amine may be used, and are preferred.

Any ratio of polythiol to polyamine can be used that will provide a suitable adhesive. The mole ratio of polythiol curing agent to amine curing agent is 25:75 to 99:1, or 40:60 to 99:1, or even 50:50 to 99:1. Glass transition temperature also tends to increase as the proportion of amine curing agent increases. The amount of the curing agent mixture used can vary considerably, depending on the properties that are wanted in the cured product, and in some cases depending on the type of curing reactions that are desired. The maximum amount of curing agent mixture typically provides up to 1.25 equivalents, preferably up to 1.15 equivalents and in some cases up to 1.05 equivalents of thiol and amine hydrogens combined per equivalent of ene and epoxy groups. Larger excesses of the curing agent tend to degrade polymer properties. Preferred ranges include ranges formed by any two of these ratios.

The reaction mixture preferably comprises at least one basic catalyst. For purposes of this invention, a basic catalyst is a compound that is capable of directly or indirectly extracting a hydrogen from a thiol group to form a thiolate anion. In some embodiments, the basic catalyst does not contain thiol groups and/or amine hydrogens. The catalyst preferably is a material having a pKa of at least 5, preferably at least 10.

Among useful types of catalysts include inorganic compounds such as salts of a strong base and a weak acid, of which potassium carbonate and potassium carboxylates are examples, various amine compounds, and various phosphines.

Suitable amine catalysts include various tertiary amine compounds, cyclic or bicyclic amidine compounds such as 1,8-diazabicyclo-5.4.0-undecene-7, tertiary aminophenol compounds, benzyl tertiary amine compounds, imidazole compounds, or mixtures of any two or more thereof.

The co-catalyst or accelerant preferably comprises a tertiaryaminophenol compound, preferably comprising one or more phenolic groups and one or more tertiary amino groups. Examples of tertiary aminophenol compounds include mono-, bis- and tris(dimethylaminomethyl)phenol, as well as mixtures of two or more of these. Benzyl tertiary amine compounds are compounds having a tertiary nitrogen atom, in which at least one of the substituents on the tertiary nitrogen atom is a benzyl or substituted benzyl group. An example of a useful benzyl tertiary amine compound is N,N-dimethyl benzylamine.

Imidazole compounds preferably comprise one or more imidazole groups. Examples of imidazole compounds include, for example, imidazole, 2-methylimidazole, 2-ethyl-4-methylimidazole, 2-undecylimidazole, 2-heptadecylimidazole, 2-phenylimidazole, 2-phenyl-4-methylimidazole, 1-benzyl-2-methylimidazole, 2-ethylimidazole, 2-isopropyl-imidazole, 2-phenyl-4-benzylimidazole, 1-cyanoethyl-2-undecylimidazole, 1-cyanoethyl-2-ethyl-4-methylimidazole, 1-cyanoethyl-2-undecylimidazole, 1-cyanoethyl-2-isopropyl-imidazole, 1-cyanoethyl-2-phenylimidazole, 2,4-diamino-6-[2'-methylimidazolyl-(1)']ethyl-s-triazine, 2,4-diamino-6-[2'-ethylimidazolyl-(1)']ethyl-s-triazine, 2,4-diamino-6-[2'-undecylimidazolyl-(1)']ethyl-s-triazine, 2-methylimidazolium-isocyanuric acid adduct, 2-phenylimidazolium-isocyanuric acid adduct, 1-aminoethyl-2-methylimidazole, 2-phenyl-4,5-dihydroxylmethyl-imidazole, 2-phenyl-4-methyl-5-hydroxymethylimidazole, 2-phenyl-4-benzyl-5-hydroxymethylimidazole, and compounds containing two or more imidazole rings obtained by dehydrating any of the foregoing imidazole compounds or condensing them with formaldehyde.

Non-limiting examples of suitable catalysts include nucleophilic amines and phosphines, ammonium and phosphonium salts, preferably nucleophilic amines. Specific examples thereof include nitrogen heterocycles such as, e.g., alkylated imidazoles (for example, 2-phenylimidazole, 2-methylimidazole, 1-methylimidazole, 2-methyl-4-ethylimidazole and 4,4'-methylene-bis(2-ethyl-5-methylimidazole); other heterocycles such as 1,8-diazabicyclo[5.4.0]undec-7-ene (DBU), diazabicyclooctene, hexamethylenetetramine, morpholine, piperidine; trialkylamines such as triethylamine, trimethylamine, benzyldimethylamine; phosphines such as triphenylphosphine, tritolylphosphine and triethylphosphine; quaternary ammonium and phosphonium salts such as triethylammonium chloride, tetraethylammonium chloride, tetraethylammonium acetate, tetraethyl ammonium bromide, benzyl triethyl ammonium chloride, triphenylphosphonium acetate, triphenylphosphonium iodide, ethyl triphenyl phosphonium iodide, and benzyl triphenyl phosphonium bromide. Lewis acids based on Al, Fe, Mg, or Zn such as, e.g., zinc carboxylate, organozinc chelate compounds, stannous octoate, and trialkyl aluminum compounds, and antimony containing catalysts, such as, e.g., triorganoantimony di- and tetraiodide are further non-limiting examples of catalysts that may be used for the production of the polymer of the present invention (of course, more than one catalyst may be used). The preferred catalysts are imidazole compounds. A particularly preferred catalyst is DBU.

The basic catalyst is preferably present in a catalytically effective amount. A suitable amount is typically from about 0.01 to about 10 moles of catalyst per equivalent of thiol and amine hydrogens in the curing agent. The catalyst or mixture of catalysts is generally employed in an amount of from about 0.01 to about 10 moles of catalyst per equivalent of thiol and amine hydrogens in the curing agents. A preferred amount is 0.5 to 1 mole of catalyst per equivalent of thiol and amine hydrogens in the curing agent.

The crosslinker portion preferably comprises an accelerator/co-catalyst which is a tertiary amine more preferably a phenolic-type tertiary amine, and still more preferably comprises 2,4,6-tri(dimethylaminomethyl)phenol, which is commercially available from Air Products and Chemicals, Inc. (Allentown, Pa.) under the trade name ANCAMINE® K54.

When present, the tertiary amine is preferably present in an amount of 0 to 5% of the total formulation. Typically it is used in an amount of 0 to 2.5 wt %.

Other components may optionally be used in adhesives according to the present invention, such as fillers, adhesion promoters, pigments, thixotropic agents, wetting agents, reactive diluents, antioxidants, etc. Such other components may comprise part of resin portion A and/or crosslinker portion B. When used, filler preferably comprise part of crosslinker portion B.

Fillers are generally added to adhesive formulations to balance properties such as viscosity mismatch (in case of 2K systems), to improve sag or mechanical performance, or to reduce the effective cost of the final formulation. In this hybrid system all of these factors can play a role in formulating the system.

Crosslinker portion B is generally lower in viscosity than resin portion A. Hence to improve the mixing efficiency, it will generally only be useful or necessary to fill crosslinker portion B. Due to the highly polar nature of components of crosslinker portion B, traditional fillers such as calcium carbonates are surprisingly found to be incompatible.

It has been found that under certain conditions, compositions of crosslinker comprising filler tend to separate upon standing. When separation occurs, the crosslinker portion B must be thoroughly mixed before use, which can be a time-consuming laborious process considering the viscosity of the crosslinker portion B. Therefore, it is desirable to avoid such separation from occurring. Without being bound by theory, it is believed that separation occurs when the highly polar cross-linking agent (especially the polythiols) are combined with less polar filler components, resulting in the more polar component migrating to the surface. It has been unexpectedly found that use of fillers that are more polar, thereby more closely matching the polarity of the cross-linking agent, reduces or eliminates separation.

That is, it has surprisingly been found that more polar fillers have increased compatibility with the higher polarity of the inventive crosslinker portions B of the present invention. It has unexpectedly been found that more closely matching the polarity of the filer to the cross-linking agent, reduces or eliminates separation. Preferred compatible fillers include polar fillers, such as metal oxides and/or hydroxides, preferably oxides and/or hydroxides of calcium, barium, and magnesium oxide, as well as mixtures of two or more thereof. Some preferred fillers include calcium oxide (e.g., PolyCal OF 325) sold by Kish Company.

Less polar fillers such as calcium carbonate, talc, and wollastonite, may be used in crosslinker portion B, but are less preferred.

When used, fillers may be present in any useful amount, and can be determined by those of ordinary skill in the art using this document as guidance. Typically, fillers may be present in amounts more than or about 3 wt %, more preferably more than or about 5 wt % of the epoxy adhesive. Fillers may be present in amounts less than or about 20 wt %, more preferably less than or about 15 wt % of the epoxy adhesive.

Rheology modifiers, such as anti-sag agents, may be added to the system, preferably to cross-linker portion B. A preferred anti-sag agent comprises silica, preferably fumed silica. A preferred commercially available product includes Cabosil-720 (Cabot Corporation).

The components of resin portion A may be mixed together into a single composition, but may be kept separate until just prior to use. Similarly, the components of crosslinker portion B may be mixed together into a single composition, but may be kept separate until just prior to use. For ease of processing and use, as well as for commercial purposes, it is preferred that all components of resin portion A are combined in a single composition, and that all components of crosslinker portion B are combined in a single composition.

A polymer of the invention preferably has a glass transition temperature from 20° C. to 120° C. or higher. In general, glass transition temperature tends to increase with increasing proportion of amine curing agent. Preferably, the glass transition temperature is at least 50° C. or at least 70° C.

EXAMPLES

Testing Procedures:

Microtensile Analysis: Tensile properties are measured on microtensile bar samples (ASTM D1708) that are prepared from cured plaques and cut with a "dogbone" shape (gauge dimensions of 0.0815 in. by 0.827 in.). Sample thicknesses are measured with a caliper and recorded to the nearest 0.0005 in. Tensile properties are measured with a Monsanto Tensiometer from Alpha Technologies. Stretching rate is 5 in/min Lap Shear testing: ASTM D-1002 standard is used to determine the shear strength of the adhesives. This test is applicable for determining adhesive strength, surface preparation parameters, and adhesive environmental durability. Two substrates are bonded together with adhesive and cured as specified. A uniform adhesive layer is maintained by adding glass beads as spacers which were 5 mil in diameter. The test specimens are placed in the grips of a universal testing machine and pulled at 1.3 mm/min (0.05 in/min) until rupture occurs. The grips used to secure the ends of the assembly must align so that the applied force is applied through the centerline of the specimen. The type of failure can be either adhesive (the adhesive separates from one of the substrates) or cohesive (the adhesive ruptures within itself).

Dynamic Mechanical Analysis: Samples are stamped with a 47.5 mm×7 mm die and cut to ca. 35 mm. Analysis is performed on a TA Instruments ARES Rheometer in the torsion fixtures. The linear viscoelastic response (4% strain with auto strain adjustment) is measured in oscillatory mode (1 Hz) with a 3° C./min temperature ramp.

Example 1

All raw materials are used as received except where noted otherwise. The Dow Polyol Voranol CP-6001 is a 15% EO capped polyol having a molecular weight of 6000 g/mol and a functionality of 3. The polyol is dried and subsequently prepolymers are made using TDI (T-80) (Aldrich).

103.7 g (595 mmol) toluene diisocyanate (TDI, 80/20 mixture of 2,4- and 2,6-isomers) are charged to a dry 2 L 4-neck round bottom flask equipped with overhead stirring, temperature control probe, addition funnel, and nitrogen inlet. The flask and its contents are heated to 80° C., and 1104 g (540 mmol) of a 6000 molecular weight, nominally trifunctional, low terminal unsaturation polyethylene terminated poly(propylene oxide) triol (Voranol™ CP 6000 from The Dow Chemical Company) is added. The solution is stirred for 30 minutes after the diol is added. A drop of dibutyltin dilaurate is added and the reaction stirred for an additional 2 hours. The product is an isocyanate-terminated prepolymer having an isocyanate content of 2.04% by weight, as determined by titration.

1180 grams of the prepolymer are brought to a temperature of 45° C. 72.8 g (630 mmol) of hydroxyethylacrylate (95%) and a drop of dibutyltin dilaurate are added. The reaction mixture is stirred at 45° C. until no measurable isocyanate groups remain as observed by FT-IR. The resulting product is a polyether capped with two terminal acrylate (—O—C(O)—CH=$CH_2$) groups per molecule.

The acrylate-tipped polyurethane is combined with liquid epoxy resin D.E.R. 383 (Dow Chemical) in Examples 2 to 4, in varying weight proportions of polyurethane to epoxy.

Example 2

The acrylate is combined with epoxy in the weight ratio of 30:70 (Acrylate:Epoxy). 6 g of the acrylate-terminated polyether produced in A above and 14 g of a 180 epoxy equivalent weight diglycidyl ether of bisphenol A (D. E. R. 383, from The Dow Chemical Company) are mixed on a high-speed laboratory mixer until homogeneous. This results in composition A1.

Separately, a 50:50 mole ratio blend of Thiocure DMPT, (2,3-bis ((2-mercaptoethyl)thio))-1-propane thiol) is obtained from Bruno Bock (0.04 moles) and isophorone diamine (0.04 moles) is mixed with 10 mg (0.066 mmole-% based on thiol groups) of 1,8-diazabicyclo[5.4.0]undec-7-ene (DBU, Sigma Aldrich technical grade). The thiol/amine/catalyst mixture (Composition B) is then mixed with the acrylate-terminated prepolymer/epoxy resin mixture on the high speed mixer to produce a clear mixture. These proportions of starting materials provide one combined equivalent of thiol and amine hydrogens per combined equivalents of acrylate and epoxide groups.

Example 3

Example 2 is repeated, except the blend ratio of acrylate and epoxy is 40:60. This results in composition A2. The curing agent contains a 50:50 mole ratio of trimethylolpropane tris(mercaptopropionate) and isophorone diamine. The proportions of starting materials provide about 1 combined equivalent of thiol and amine hydrogens per combined equivalents of acrylate and epoxide groups.

Example 4

Example 1 is repeated, except the blend ratio of acrylate and epoxy is 50:50. This results in composition A3. The curing agent contains a 50:50 mole ratio of trimethylolpropane tris(mercaptopropionate) and isophorone diamine. The proportions of starting materials provide about 1 combined equivalent of thiol and amine hydrogens per combined equivalents of acrylate and epoxide groups.

Figure 1:
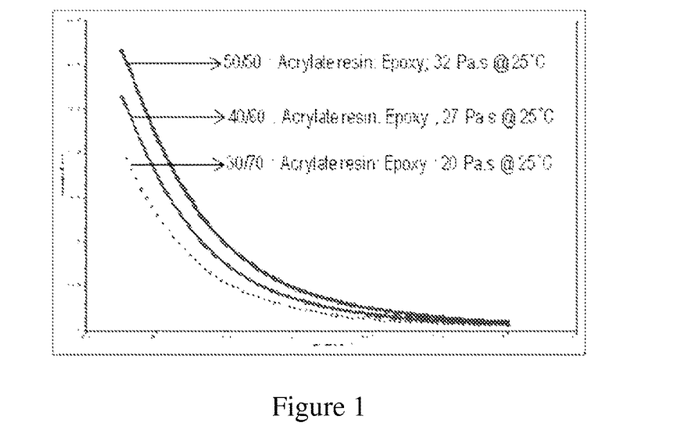
FIG. 1 shows viscosity as a function of temperature for three compositions according to the present invention.

FIG. 1 shows the viscosities of compositions A1, A2, and A3 as a function of temperature. The acrylate component has a polyurethane backbone derived from a triol. The urethane content of the acrylate capped prepolymer produces a high viscosity liquid that is difficult to process at room temperature. The epoxy (D.E.R. 383), however, has a lower room-temperature viscosity than the acrylate, hence blending it with the acrylate helps reduce the viscosity of the blend. As can be seen, the lower the proportion of acrylate resin:epoxy, the lower the viscosity of the combination.

A portion of the mixture derived from compositions A1 and B is poured into a mold warmed to 50° C. The filled mold is then placed in a 50° C. oven overnight. A tack-free plaque is obtained. Similar procedures are followed for other compositions as well. Some properties of the cured adhesives are shown in Table 1.

TABLE 1

| Properties | A1/B | A2/B | A3/B |
| --- | --- | --- | --- |
| tensile strength, psi | 5196 | 3979 | 2972 |
| elongation, % | 15 | 35 | 61 |
| Tg, ° C. (ARES) | 106 | 100 | 99 |
| Modulus, psi | na | 79780 | 66395 |

As the epoxy content increases, a higher modulus system is obtained. It was also found that there was a concomitant increase in tensile strength and loss of elongation that scaled with epoxy content resulting in systems which behave more like a toughened epoxy than elastomeric polyurethane above 50% epoxy.

Figure 2:
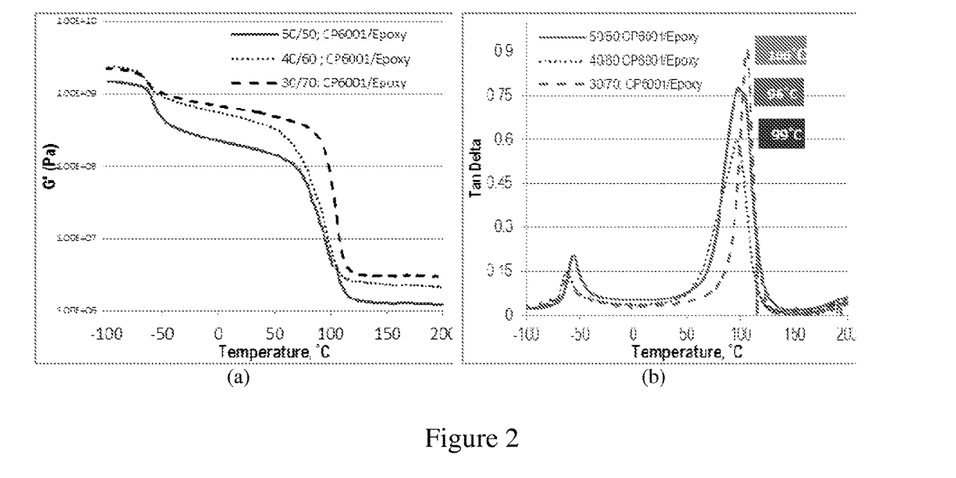
FIGS. 2a and 2b show the effect of epoxy content on dynamic mechanical thermal analysis of hybrid plaque of the present invention.

As can be seen in FIGS. 2a and 2b, dynamic mechanical analysis of the system reveals a dual Tan delta. The first peak is observed at −50° C. corresponding to the polyurethane soft segment, and the second peak is between 95 to 110° C. corresponding to the hard, epoxy segment of the hybrid system. The Tg of −50° C. is consistent with the Tg of polyurethane derived from polyether polyols.

The second Tg is strongly dependent upon the epoxy content. The presence of amine curative in the form of IPDA drives the Tg of the material to >90° C., which would otherwise be limited to about 40° C. with thiol curing. One notable feature of these systems is the stable storage modulus (G') up to 200° C. Without being bound by theory, it is hypothesized that the covalent linkages of the epoxy hard segment, instead of hydrogen bonding found in polyurethane systems, provides increased thermal stability above the Tg of the hard segment.

Example 5

As seen in the above Examples, higher epoxy content leads to a more favorable Tg, but the elongation is considerably lost. Resin portion A3, having a 50:50 blend of epoxy and acrylate, is employed for further study due to its overall balance between elongation and Tg. In an attempt to improve the elongation, the effect of 2-amino propanol (AP) in the formulation is evaluated. IPDA is partially replaced partially with AP to reduce the functionality of the system, thereby decreasing the cross-linking system.

Four crosslinker portions B are prepared. These have the same composition as crosslinker portion B of Example 2, except that the 50:50 blend of IPDA and DMPT is replaced with the following blends of AP:IPDA:THIOCURE DMPT. Crosslinker portion B1 (0:50:50—same as Example 2); crosslinker portion B2 (10:40:50); crosslinker portion B3 (20:30:50); and crosslinker portion B4 (25:25:50).

Resin portion A3 is combined with the above crosslinker portions B1-B4, and cured in the same way as done in Example 3. Results are shown in Table 2.

TABLE 2

| Properties | A3/B1 | A3/B2 | A3/B3 | A3/B4 |
|---|---|---|---|---|
| tensile strength, psi | 2972 | 2791 | 2516 | 2500 |
| Elongation, % | 61 | 51 | 80 | 79 |
| Tg, ° C. (ARES) | 99 | 96 | 92 | 90 |
| Modulus, psi | 66395 | 71016 | 59303 | 57876 |

Crosslinker portions B3 and B4 increase the elongation at break to about 80% in comparison with about 60% for crosslinker portion B1. This increase in elongation is accompanied by a decrease in tensile strength of 500 psi. Below 20 parts of AP, there is no substantial effect on the mechanical properties of the hybrid system. At 30 parts of AP, the formulation is found to be tacky possibly due to lower cross-linking and hence the properties could not be measured.

Figure 3:
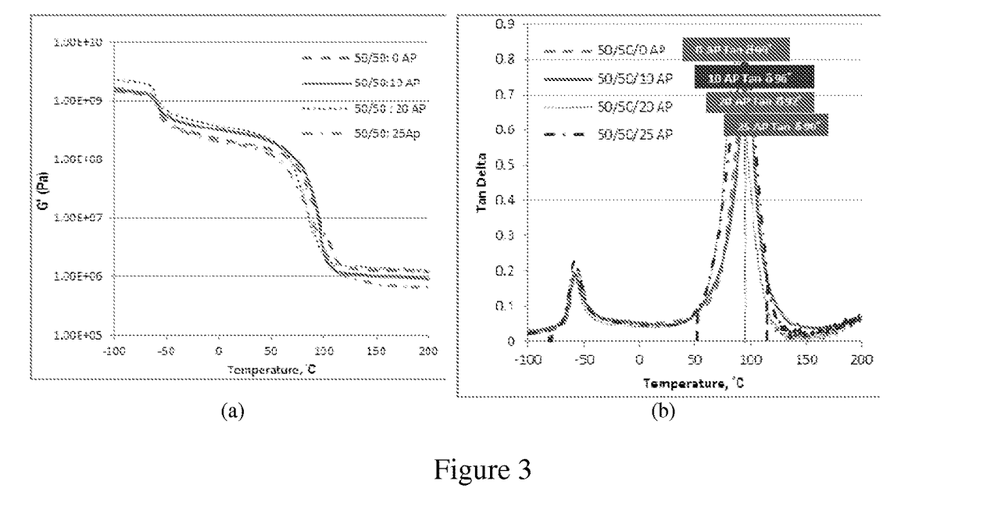
FIGS. 3a and 3b show the effect of 2-aminopropanol content on dynamic mechanical thermal analysis of hybrid plaque of the present invention.

The effect of 2-aminopropanol on the dynamic mechanical thermal analysis (DMTA) indicates that the material is well phase separated, as can be seen by the narrow tan delta peaks in FIGS. 3a and 3b. The reduced cross-link density of the hard segments results in a lower Tg with the use of AP.

Example 6

Adhesive strength is the force needed to pull the polymer away from the substrate. One major way to improve the adhesive properties is augment the type of bonding the adhesive shares with the substrates, viz: hydrogen, chemical, and ionic interaction. Chemical interaction results in covalent bonding with the substrates and hence is considered the most effective bonding technique. Epoxy materials are known in literature to provide excellent adhesion to metals.

ASTM D-1002 standard is used to determine the shear strength of the adhesive. System A3/B3 was used for all further studies. Different substrates are used to evaluate the overall adhesive strength of the adhesives. A uniform adhesive layer is maintained by adding 5 mil glass beads as spacers. All the substrates are cleaned in IPA solution. Due to the presence of mold release on the carbon-fiber reinforced polymer (CFRP) surface, it is first treated by abrading the surface. No adhesion promoters are added to the system.

TABLE 3

| Substrate | Strength, Mpa | Failure Mode |
|---|---|---|
| Steel | 7 | Cohesive Failure |
| E-coated SS | 12.4 | Cohesive failure |

TABLE 3-continued

| Substrate | Strength, Mpa | Failure Mode |
|---|---|---|
| Aluminum | 5 | Adhesive failure |
| CFRP-Abraded | 12 | Cohesive failure |

Lap shear measurements of the hybrid adhesive are shown in Table 3. All substrates but aluminum show cohesive failure, wherein the adhesive ruptures within itself. The presence of epoxy, as well as the hybrid close network from the elastomer, helped the lap shear strength, leading to cohesive failure.

Example 7

Figure 4:
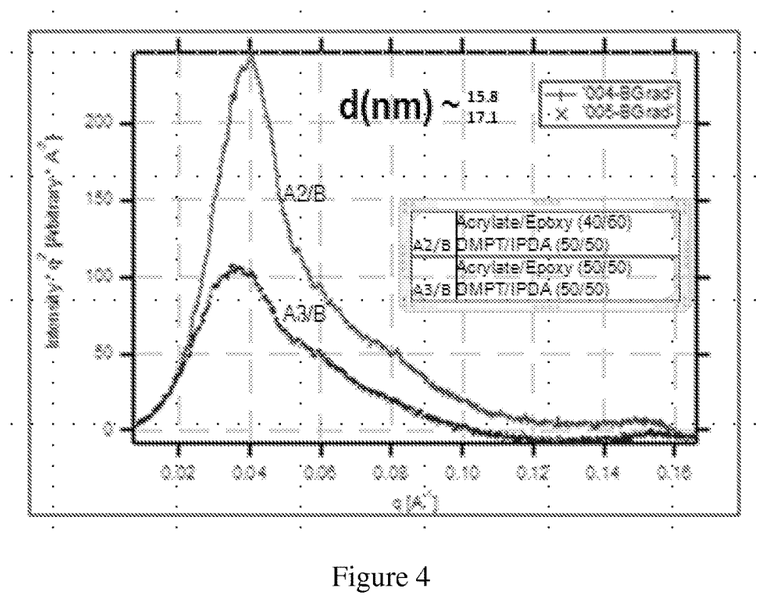
FIG. 4 shows SAXS of 2% NCO CP6001 MWt polyol capped with acrylate epoxy hybrid co-cured with thiol and amine.

FIG. 4 provides the small-angle x-ray scattering (SAXS) patterns prepared from adhesives A2/B (upper line) and A3/B (lower line) of Example 4. The well-defined scattering peak on the SAXS profile for all samples correlates with the micro phase separation for the samples. The micro phase separation seems to improve with higher IPDA content.

Example 8

Figure 5:
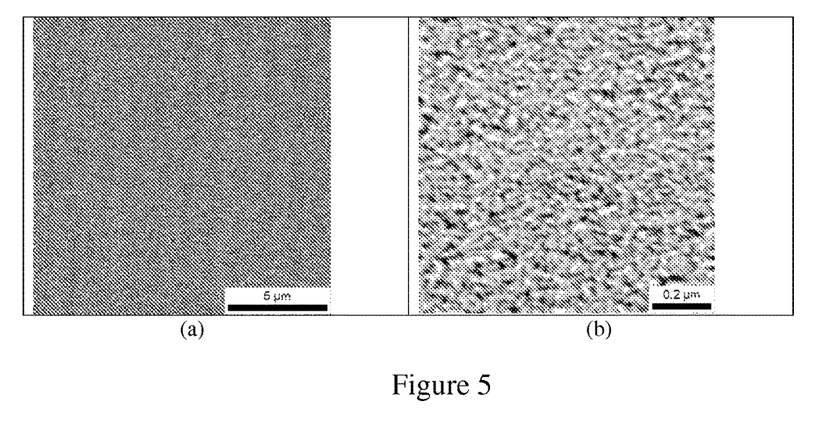
FIGS. 5a and 5b are AFM photographs of 2% NCO CP6001 MWt polyol capped with acrylate epoxy hybrid co-cured with thiol and amine.

Adhesive sample A3/B1 of Example 4 is photographed using atomic force microscopy (AFM). See FIGS. 5a (5 µm reference line) and 5b (0.2 µm reference line). The photographs indicate that the hybrid system is surprisingly microphase separated. Higher amine content appears to drive the extent of microphase segregation.

Example 9

Figure 6:
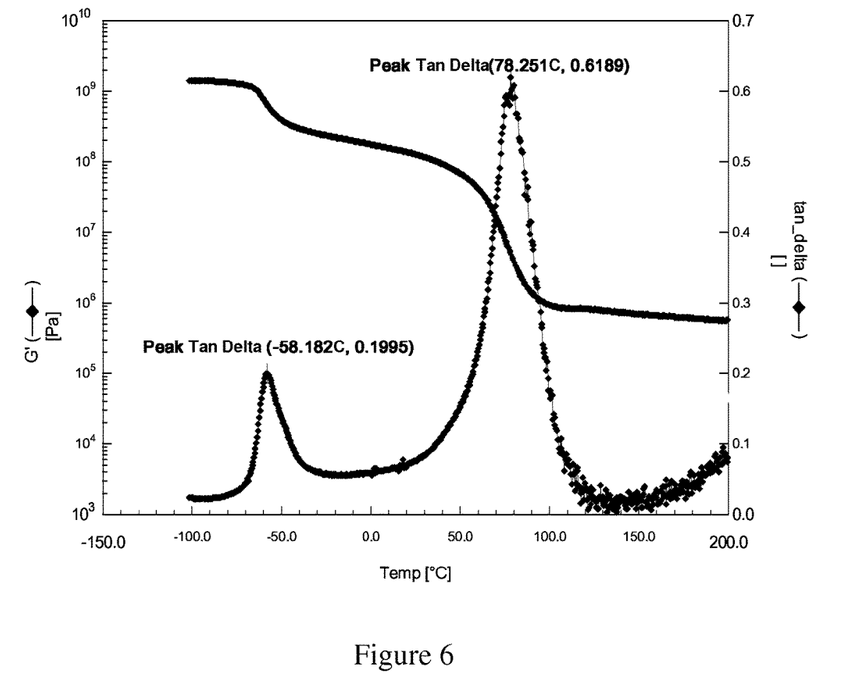
FIG. 6 shows dynamic mechanical thermal analysis of hybrid plaque formulated with ATBN.

FIG. 6 shows dynamic mechanical thermal analysis of hybrid plaque formulated with amine-terminated butadiene and butadiene-acrylonitrile copolymers (Hycar ATBN, Emerald Performance Materials), a typical epoxy filler. As can be seen, ATBN results in plasticizing the system and thereby lowering the Tg of the material.

A3/B3 is used for all further studies, with curing conditions are similar to example 3.

Calcium oxide (Aldrich) is used as the filler to make the formulated system. Cabosil TS-720 (Cabot) is medium surface area fumed silica modified with polydimethylsiloxane.

The effect of filler loading on the inventive system is evaluated and is shown in Table 4. It is found that as the filler loading increases, both the tensile strength and % elongation tend to decrease. It is believed that this indicates the tendency of the filler to aggregate, resulting in loss of properties. For the adhesives of this Example, the system with 5% CaO and 1% cabosil appears to show the most promising results.

TABLE 4

| Properties | 50/50 0% CaO 0% Cabosil 720 | 50/50 5% CaO 1% Cabosil 720 | 50/50 10% CaO 1% Cabosil 720 | 50/50 20% CaO 1% Cabosil 720 |
|---|---|---|---|---|
| TS, psi | 2516 | 2236 | 1406 | 964 |
| TS, MPa | 17 | 15 | 10 | 6.7 |
| Elongation, % | 80 | 59 | 56 | 40 |
| Modulus, psi | 59303 | 49840 | 8036 | 9107 |
| Modulus, MPa | 409 | 344 | 55 | 63 |

The invention claimed is:

1. An adhesive composition comprising resin portion A and crosslinker portion B:
   the resin portion A having a viscosity of 30 Pa·sec or less at 25° C., the resin portion A comprising a mixture of
   A1) an acrylate-tipped polyurethane wherein the acrylate-tipped polyurethane contains a polyether chain having a mass of at least 3000 atomic mass units, and
   A2) an epoxy resin wherein the epoxy resin is a polyglycidyl ether of a polyphenol, has an epoxy equivalent weight of up to 225 and is a liquid at 25° C.;
wherein the weight ratio of A1) to A2) is greater than or about 30:70 and less than or about 60:40;
   the crosslinker portion B comprising a mixture of
   B1) a polythiol,
   B2) a polyamine, and
   B3) a catalyst,
wherein the weight ratio of B1) to B2 is 25:75 to 99:1.

2. The adhesive composition of claim 1, wherein the acrylate-tipped polyurethane can be obtained by reacting a polyol with a multifunctional isocyanate to complete reaction of the isocyanate to obtain a pre-polymer, and capping the pre-polymer with acrylate groups.

3. The adhesive composition of claim 1 wherein the polythiol comprises 2,3-di((2-mercaptoethyl)thio)-1-propanethiol.

4. The adhesive composition of claim 1 wherein the polyamine comprises 2,4,6-tri(dimethylaminomethyl)phenol.

5. The adhesive composition of claim 1 wherein the catalyst comprises 1,8-diazobicyclo[5.4.0]undec-7-ene.

6. The adhesive composition of claim 1 wherein the crosslinker portion B a highly polar filler.

7. The adhesive composition of claim 6, wherein the highly polar filler comprises a metal oxide or hydroxide.

8. A method of bonding two surfaces comprising:
   a) providing a resin portion A having a viscosity of 30 Pa·sec or less at 25° C., the resin portion A comprising a mixture of A1) an acrylate-tipped polyurethane and A2) an epoxy resin, wherein the acrylate-tipped polyurethane contains a polyether chain having a mass of at least 3000 atomic mass units, the epoxy resin is a polyglycidyl ether of a polyphenol, has an epoxy equivalent weight of up to 225 and is a liquid at 25° C., and the weight ratio of A1) to A2) is greater than or about 30:70 and less than or about 60:40; and
   b) providing a crosslinker portion B comprising a mixture of B1) a polythiol, B2) a polyamine and B3) a catalyst, wherein the weight ratio of B1) to B2 is 25:75 to 99:1;
   c) combining the resin portion A and the crosslinker portion B to form an uncured adhesive;
   d) applying the uncured adhesive such that it is in contact with a first surface and a second surface; and then
   e) curing the uncured adhesive in contact with the first surface and the second surface.

9. The method of claim 8 wherein the polythiol comprises 2,3-di((2-mercaptoethyl)thio)-1-propanethiol and the polyamine comprises isophorone diamine.

10. The method of claim 9 wherein the catalyst comprises 1,8-diazobicyclo[5.4.0]undec-7-ene.

11. The method of claim 10 wherein the crosslinker portion B comprises a metal oxide or hydroxide.

* * * * *